(12) United States Patent
Voonna et al.

(10) Patent No.: US 8,606,259 B2
(45) Date of Patent: Dec. 10, 2013

(54) METHOD AND SYSTEM FOR TESTING A SOFTWARE-DEFINED RADIO DEVICE

(75) Inventors: Thirumalarao Voonna, Garland, TX (US); Jasmin Oz, Plano, TX (US); Eran Pisek, Plano, TX (US); Thomas M. Henige, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1380 days.

(21) Appl. No.: 11/655,471

(22) Filed: Jan. 19, 2007

(65) Prior Publication Data

US 2008/0003949 A1 Jan. 3, 2008

Related U.S. Application Data

(60) Provisional application No. 60/817,145, filed on Jun. 28, 2006.

(51) Int. Cl.
*H04W 24/00* (2009.01)

(52) U.S. Cl.
USPC ..... 455/423; 455/418; 455/550.1; 455/552.1; 455/226.1; 455/226.3; 455/226.4; 455/67.11; 455/67.13; 455/67.14; 709/203; 717/168

(58) Field of Classification Search
USPC .......... 455/552.1, 550.1, 423, 418, 11.1, 455/226.1, 226.3, 226.4, 67.11, 67.14, 455/67.13; 709/203; 717/168
See application file for complete search history.

(56) References Cited

U.S. PATENT DOCUMENTS

| | | | |
|---|---|---|---|
| 6,954,636 B2 * | 10/2005 | Matsuo et al. | 455/418 |
| 2002/0082044 A1 * | 6/2002 | Davenport | 455/552 |
| 2003/0236089 A1 * | 12/2003 | Beyme et al. | 455/423 |
| 2004/0048608 A1 * | 3/2004 | Matsuo et al. | 455/418 |
| 2004/0242261 A1 * | 12/2004 | Fette | 455/550.1 |
| 2005/0059427 A1 * | 3/2005 | Wallace | 455/552.1 |
| 2005/0272419 A1 * | 12/2005 | Matsuo et al. | 455/423 |
| 2006/0046644 A1 * | 3/2006 | Chung et al. | 455/11.1 |
| 2006/0130040 A1 * | 6/2006 | Subramanian et al. | 717/168 |
| 2006/0161314 A1 * | 7/2006 | Honmura | 701/1 |
| 2006/0195773 A1 * | 8/2006 | Pisek et al. | 714/795 |
| 2006/0282497 A1 * | 12/2006 | Braun et al. | 709/203 |
| 2006/0287001 A1 * | 12/2006 | Budampati et al. | 455/552.1 |

* cited by examiner

*Primary Examiner* — Junpeng Chen

(57) ABSTRACT

A method for testing a software-defined radio (SDR) device is provided. The method includes configuring the SDR device for a first standard. A first test is performed on the SDR device under the first standard. Test data for the first test is received from the SDR device. A switching time for configuring the SDR device for the first standard is determined based on the test data for the first test.

25 Claims, 7 Drawing Sheets

400

METHOD AND SYSTEM FOR TESTING A SOFTWARE-DEFINED RADIO DEVICE

CROSS-REFERENCE TO RELATED APPLICATIONS AND CLAIM OF PRIORITY

The present application is related to U.S. Provisional Patent No. 60/817,145, filed Jun. 28, 2006, titled "Software Defined Radio (SDR) Test Tool." U.S. Provisional Patent No. 60/817,145 is assigned to the assignee of the present application and is hereby incorporated by reference into the present disclosure as if fully set forth herein. The present application hereby claims priority under 35 U.S.C. §119(e) to U.S. Provisional Patent No. 60/817,145.

TECHNICAL FIELD OF THE INVENTION

The present application relates generally to wireless communication networks and, more specifically, to a method and system for testing a software-defined radio (SDR) receiver.

BACKGROUND OF THE INVENTION

Designing data processors for use in mobile stations is inherently difficult due to the tradeoffs that must be made between competing considerations, including energy efficiency, computation power, and flexibility. Most current multi-standard wireless devices comprise blocks of independent ASIC devices, each of which is related to a different wireless standard. However, this approach results in increased die size, increased power consumption, and lack of flexibility. As an alternative, SDR devices may be used.

SDR devices use reconfigurable hardware that may be programmed over the air to operate under different wireless protocols. For example, an SDR transceiver in a wireless laptop computer may be configured by a first software load to operate in a CDMA2000 wireless network and may be reconfigured by a second software load to operate in an HSDPA wireless network. SDR systems minimize cost and power consumption, while maximizing flexibility, thereby providing an optimized combination of scalability and modularity.

In order to test an SDR receiver operating under different standards, currently-available testing methods use a different set of test equipment for each standard to be tested. However, each set of test equipment is expensive. In addition, using these methods, an SDR receiver's ability to switch quickly between standards may not be tested easily. Therefore, there is a need in the art for an improved method of testing an SDR receiver operating under different standards.

SUMMARY OF THE INVENTION

A method for testing a software-defined radio (SDR) device is provided. According to an advantageous embodiment of the present disclosure, the method includes configuring the SDR device for a first standard. A first test is performed on the SDR device under the first standard. Test data for the first test is received from the SDR device. A switching time for configuring the SDR device for the first standard is determined based on the test data for the first test.

According to another embodiment of the present disclosure, a system for testing an SDR receiver is provided that includes a data block generator, a results generator, and a test controller. The data block generator is operable to perform a producer thread. The results generator is operable to perform a consumer thread. The test controller is operable to configure the SDR receiver for one of a plurality of standards and to initiate a test by prompting the data block generator to perform the producer thread and by prompting the results generator to perform the consumer thread.

According to yet another embodiment of the present disclosure, a system for testing an SDR device is provided that includes a test module and the SDR device. The test module is operable to perform a producer thread and to perform a consumer thread. The SDR device is coupled to the test module and comprises a performance analyzer that is operable to generate test data for the test module.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged testing system.

Figure 1:
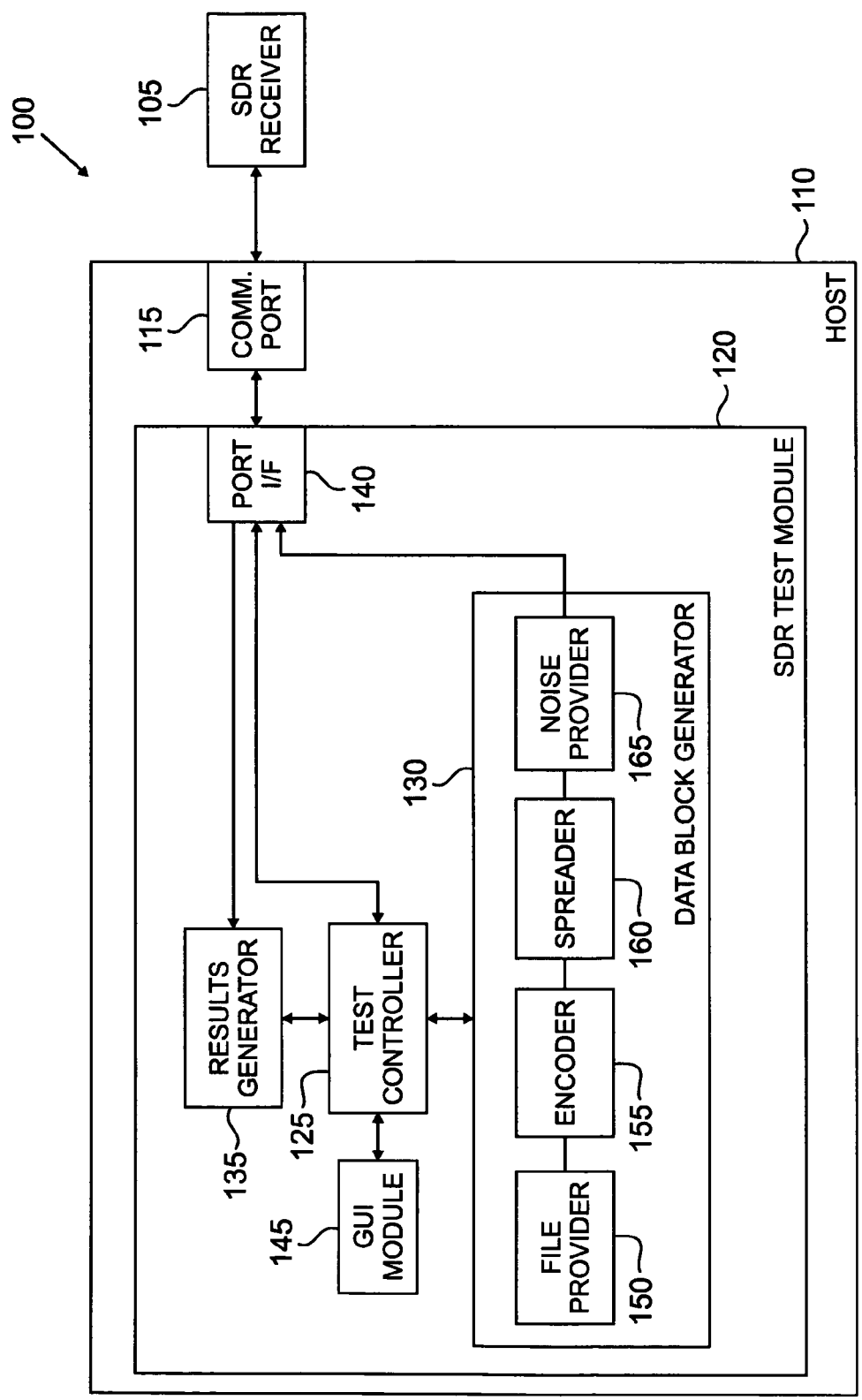
FIG. 1 illustrates a system for testing an SDR receiver according to one embodiment of the disclosure.

FIG. 1 illustrates a system 100 for testing an SDR receiver 105 according to one embodiment of the disclosure. For this embodiment, the system 100 comprises a host 110 coupled to the SDR receiver 105 via a communication port 115 of the host 110. The host 110, which may comprise a personal computer or other similar computing device, comprises an SDR test module 120.

The SDR test module 120 comprises a test controller 125, a data block generator 130 and a results generator 135. Although illustrated and described as separate components, it will be understood that any two or all of the test controller 125, the data block generator 130 and the results generator 135 may be implemented together as a single component without departing from the scope of the present disclosure.

The SDR test module 120 also comprises a port interface (I/F) 140, which is operable to couple the test controller 125, the data block generator 130 and the results generator 135 to the communication port 115. Thus, the test controller 125, the data block generator 130 and the results generator 135 are each operable to communicate with the SDR receiver 105 via the communication port 115. For one embodiment, the communication port 115 may comprise a universal serial bus (USB) port; however, it will be understood that the communication port 115 may comprise any suitable type of port.

The test controller 125 is operable to control the testing process performed by the SDR test module 120. For one embodiment, the test controller 125 is coupled to a graphical user interface (GUI) module 145 that is operable to receive testing parameter selections from a user of the SDR test module 120 and/or to display results of each test to the user.

The test controller 125 is operable to configure the SDR receiver 105 for a particular standard in order to test the operation of the SDR receiver 105 under that standard. For example, the SDR receiver 105 may be configured to operate under WiBro/WiMax, WCDMA/HSDPA, CDMA2000, GSM/EDGE, LTE and/or any other suitable standard. Thus, prior to the testing process, the test controller 125 is operable to communicate with the SDR receiver 105 through the communication port 115 in order to configure the SDR receiver 105 for the standard to be tested. As described in more detail below, the test controller 125 is also operable to configure the data block generator 130 based on the standard to be tested.

The test controller 125 is operable to initiate a test by prompting the data block generator 130 to perform a producer thread. As described in more detail below in connection with FIG. 3, a producer thread comprises a process that produces a plurality of encoded data blocks for the SDR receiver 105 to decode. In addition, a producer thread involves the transmitting of data via the communication port 115 to the SDR receiver 105.

The test controller 125 is also operable to initiate the test by prompting the results generator 135 to perform a consumer thread. As described in more detail below in connection with FIG. 3, a consumer thread comprises a process that involves receiving a plurality of decoded data blocks from the SDR receiver 105 at the communication port 115. The producer thread and the consumer thread may be performed at approximately the same time such that the consumer thread runs simultaneously with the producer thread. As used herein, "simultaneously" means that, at some point, the threads are running concurrently, even if one thread begins or ends before the other. Therefore, the SDR test module 120 is operable to transmit data to and receive data from the SDR receiver 105 via the communication port 115 at the same time, allowing the testing process to be executed more quickly. However, for some single-threaded embodiments, such as when the communication port does not support parallel receive and transmit operations, the data block generator 130 may be operable to perform the producer thread before the results generator 135 performs the consumer thread.

For the illustrated embodiment, the data block generator 130 comprises a file provider 150, an encoder 155, a spreader 160 and a noise provider 165. The file provider 150 is operable to provide an original file, such as an image file, a text file or any other type of file, to the encoder 155. For example, the test controller 125 may provide a file location based on user selections to the data block generator 130, and the file provider 150 may be operable to retrieve the file from the specified location. For another embodiment, a single file may be used for each testing process. In this and some other embodiments, no user selection is needed.

Based on testing parameters provided by the test controller 125, the encoder 155 is operable to encode the original file, the spreader 160 is operable to spread the file, and the noise provider 165 is operable to add noise to the file. For example, for a particular embodiment, the original file may comprise an image file, and the original image file may be encoded by the encoder 155 of the data block generator 130 in 256-bit data blocks. In addition, the noise provider 165 may be operable to add white Gaussian noise in accordance with a selected noise level. However, it will be understood that the original file may comprise any suitable type of file encoded in blocks of any suitable size and that the noise may comprise any suitable type of noise. The testing parameters may be selected by a user of the SDR test module 120, provided by a testing parameter file, determined by the test controller 125 based on a testing algorithm that may sequence through a number of test cases and determine parameters for each case, determined by the test controller 125 based on a testing algorithm that may determine parameters randomly and/or based on any other suitable testing parameter selection algorithm.

As the data block generator 130 generates each block of data, the encoded data block is provided to the communication port 115 through the port interface 140. The encoded data block is then provided to the SDR receiver 105, which is operable to decode the encoded data block according to the previously configured standard. After decoding each data block, the SDR receiver 105 is operable to provide the decoded data block to the communication port 115 and, through the port interface 140, to the results generator 135.

Once each of the decoded data blocks has been received, the results generator 135 is operable to construct a processed file using the decoded data blocks and to provide the processed file to the user (for example, by displaying an image file). For a successful test, the processed file ideally comprises a copy of the original file encoded by the data block generator 130. For another embodiment, the results generator 135 may be operable to construct the processed file as the decoded data blocks are being received.

After the decoding process is complete, the SDR receiver 105 is operable to provide test data to the results generator 135, which is operable to calculate and display statistical results to the user based on that test data. The statistical results may comprise a time to reconfigure the SDR receiver 105 for a different standard, a time to decode the data blocks, a bit error rate, a frame error rate and/or the like.

For a particular example of one embodiment, the SDR test module 120 may comprise a scalable application written in Microsoft Foundation Class (MFC) Library. In addition, the SDR test module 120 may support Viterbi encoding with either no spreading or spreading according to the WCDMA or HSDPA standards. Also, the SDR test module 120 may support binary turbo encoding, as in the WCDMA/HSDPA and CDMA2000 standards, and duobinary turbo encoding, as in the WiBro and WiMax standards. The SDR test module 120 is flexible and may also support configurations that are a superset of the configurations appearing in the standards. For example, the SDR test module 120 may allow Viterbi, binary turbo and duobinary turbo encoding with polynomials and rates that are not defined in any standard. The SDR test module 120 may also support the addition of both noise and soft bit scaling.

Figure 2:
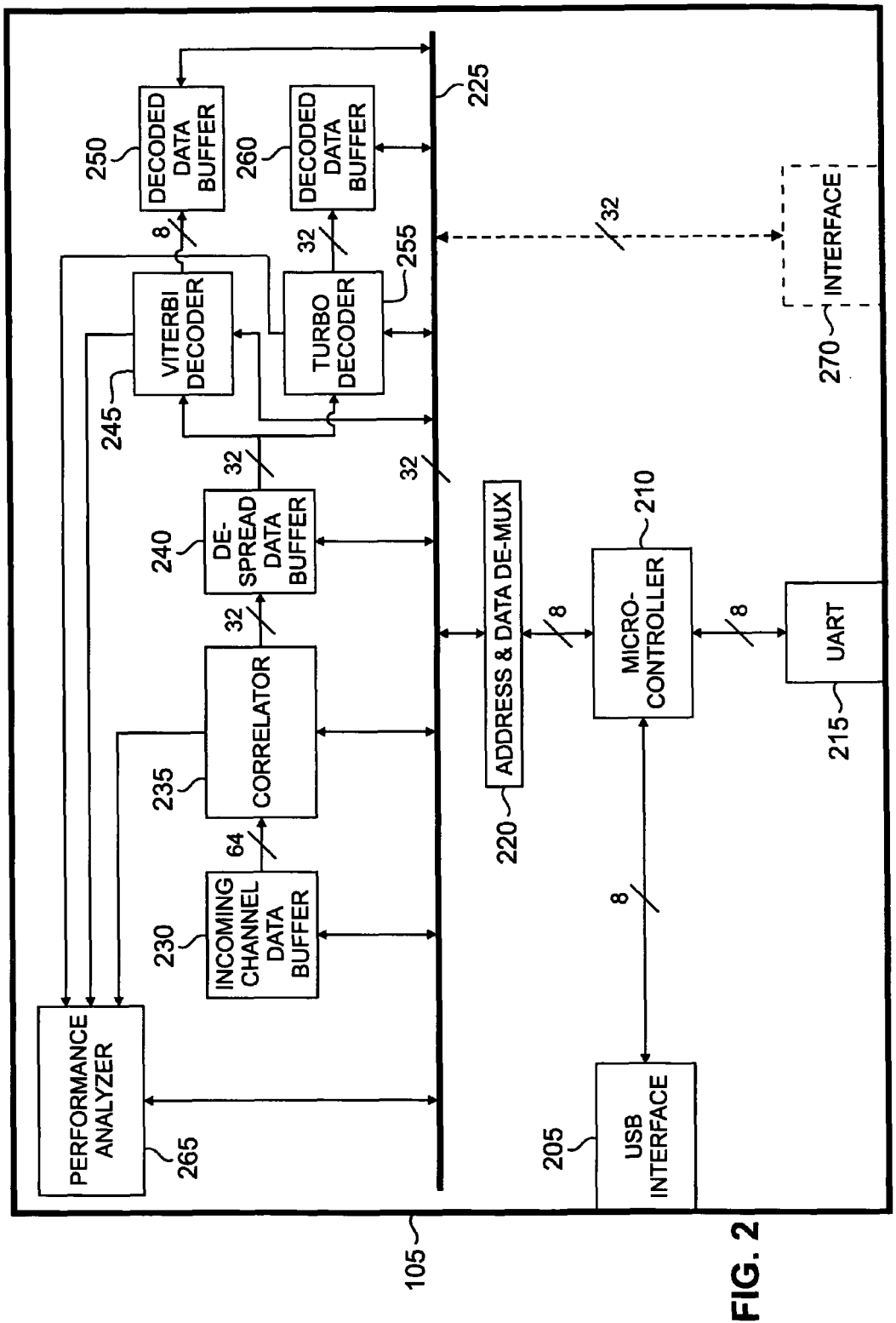
FIG. 2 illustrates details of the SDR receiver of FIG. 1 according to one embodiment of the disclosure.

FIG. 2 illustrates details of an example of the SDR receiver 105 according to one embodiment of the disclosure. The SDR receiver 105 may comprise a field-programmable gate array (FPGA), an application-specific integrated circuit (ASIC), a digital signal processor (DSP), a microprocessor, a processing board or module, or other suitable programmable device.

For the illustrated example, the SDR receiver 105 comprises a USB interface 205, a microcontroller 210, a universal asynchronous receiver-transmitter (UART) 215, an address/data demultiplexer 220, a bus 225, an incoming channel data buffer 230, a correlator 235, a de-spread data buffer 240, a Viterbi decoder 245, a first decoded data buffer 250, a turbo decoder 255, a second decoded data buffer 260, a performance analyzer 265 and one or more additional interfaces 270, such as another USB interface, an advanced microcontroller bus architecture (AMBA) interface and/or any other suitable interface. In addition, it will be understood that the SDR receiver 105 may comprise additional components not illustrated in FIG. 2.

The USB interface 205 is operable to provide communication between the communication port 115 of the host 110 and the microcontroller 210. For this embodiment, the communication port 115 comprises a USB port. The microcontroller 210 is operable to communicate with the UART 215 and the address/data demultiplexer 220. The address/data demultiplexer 220 is operable to couple the microcontroller 210 to other components of the SDR receiver 105 through the bus 225.

The incoming channel data buffer 230 is operable to store encoded data blocks received from the data block generator 130 and to provide each encoded data block to the correlator 235. The correlator 235 is operable to de-spread each encoded data block and to provide the de-spread data block to the de-spread data buffer 240. In addition, the correlator 235 is operable to provide de-spread data statistics to the performance analyzer 265. The de-spread data buffer 240 is operable to provide the de-spread data block to one of the decoders 245 and 255 for decoding in accordance with the standard for which the SDR receiver 105 is configured.

After decoding, the Viterbi decoder 245 or the turbo decoder 255 is operable to provide the decoded data block to a corresponding decoded data buffer 250 or 260. In addition, the decoders 245 and 255 are each operable to notify the performance analyzer 265 that the encoded data block has been decoded. The microcontroller 210 is also operable to send each decoded data block to the results generator 135 via the USB interface 205.

In addition, after each of the encoded data blocks for a particular file has been decoded, the performance analyzer 265 is operable to generate test data related to the decoding process and to provide the test data to the microcontroller 210 for sending to the results generator 135 via the USB interface 205. Because the performance of the SDR receiver 105 is measured by the performance analyzer 265 within the SDR receiver 105, timing measurements are more accurate as compared to timing measurements performed by an external tool, such as an analyzer implemented in the SDR test module 120, for example. The use of such an external tool would introduce timing errors based on the amount of time for the data to be transmitted to the tool for measurement.

Figure 3:
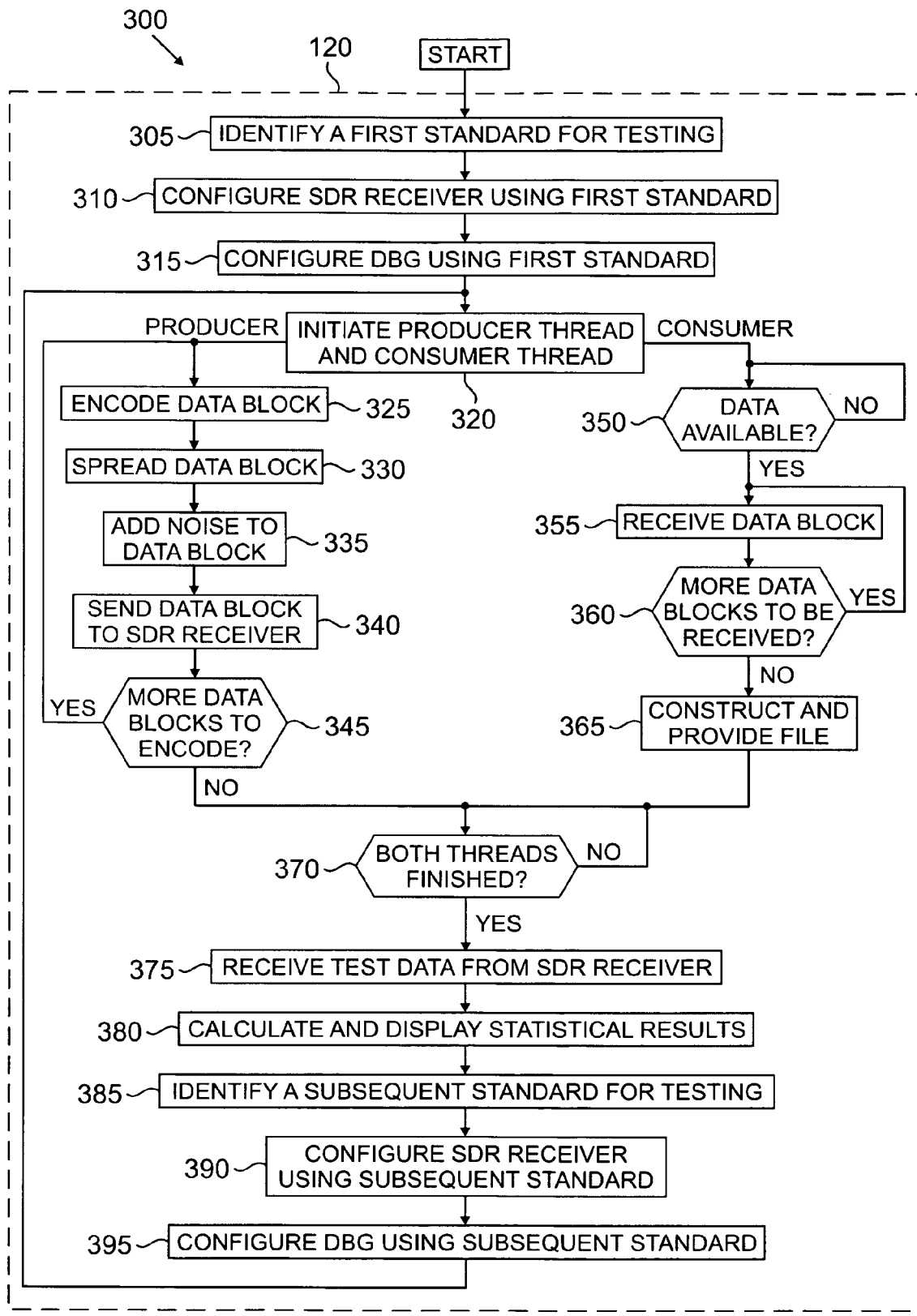
FIG. 3 illustrates a method for testing the SDR receiver using the SDR test module of FIG. 1 according to one embodiment of the disclosure.

FIG. 3 illustrates a method 300 for testing the SDR receiver 105 using the SDR test module 120 according to one embodiment of the disclosure. Initially, a first standard is identified for testing the SDR receiver 105 (process step 305). For example, WiBro/WiMax, WCDMA/HSDPA, CDMA2000, GSM/EDGE, LTE and/or any other suitable standard may be identified. The standard may be identified by a user through the GUI module 145 or in any other suitable manner.

The test controller 125 configures the SDR receiver 105 for operating under the first standard (process step 310). In addition, the test controller 125 configures the data block generator (DBG) 130 for testing the SDR receiver 105 using the first standard (process step 315). For example, the test controller 125 may provide testing parameters for the file provider 150, the encoder 155, the spreader 160 and/or the noise provider 165. The testing parameters may be selected by a user of the SDR test module 120, provided by a testing parameter file, determined by the test controller 125 based on a testing algorithm that may sequence through a number of test cases and determine parameters for each case, determined by the test controller 125 based on a testing algorithm that may determine parameters randomly and/or based on any other suitable testing parameter selection algorithm.

For the illustrated embodiment, the test controller 125 prompts the data block generator 130 to initiate a producer thread and the results generator 135 to initiate a consumer thread simultaneously with the producer thread (process step 320). Thus, while the data block generator 130 is performing steps 325, 330, 335, 340 and 345, the results generator 135 is performing the steps 350, 355, 360 and 365 at the same time. However, it will be understood that the producer thread may be performed before the consumer thread for a single-threaded application without departing from the scope of this disclosure.

For the producer thread, the encoder 155 of the data block generator 130 encodes a data block, which corresponds to a portion of the original file provided by the file provider 150 (process step 325). The spreader 160 then spreads the data block (process step 330) and the noise provider 165 adds noise to the data block (process step 335). The encoding, spreading, and adding of noise are performed in accordance with the configuration of the data block generator 130 for the standard that is being tested.

The SDR test module 120 sends the encoded data block to the SDR receiver 105 via the communication port 115 (process step 340). If there are more data blocks of the file to encode (process step 345), the encoder 155 encodes a subsequent data block (process step 325) and the producer thread continues as before until there are no more data blocks to encode (process step 345).

For the consumer thread, the results generator 135 waits until data is available at the communication port 115 (process step 350), indicating that an encoded data block has been decoded by the SDR receiver 105 and returned to the SDR test module 120. Once data is available at the communication port 115 (process step 350), the results generator 135 receives the decoded data block (process step 355).

The results generator 135 continues to receive decoded data blocks (process step 355) until each of the decoded data blocks for the file has been received (process step 360). Once each of the decoded data blocks has been received (process step 360), the results generator 135 constructs a processed file based on the decoded data blocks and provides and the processed file to the user (process step 365). For example, for an image file, the results generator 135 displays the constructed image file for the user to see.

Once there are no more data blocks to encode in the producer thread (process step 345) and the processed file has been provided by the results generator 135 in the consumer thread (process step 365), the SDR test module 120 ensures that both threads are finished (process step 370). Once both threads are finished (process step 370), the SDR test module 120 receives test data generated by the performance analyzer 265 of the SDR receiver 105 (process step 375).

The results generator 135 calculates and displays statistical results based on the test data received from the SDR receiver 105 (process step 380). For example, the results generator 135 may provide the statistical results for display through the GUI module 145 via the test controller 125.

At any point after the producer and consumer threads are finished (process step 370), a subsequent standard may be identified for testing in the SDR receiver 105 (process step 385). For example, if the first standard tested was a WiBro standard, the subsequent standard to be tested may be a WCDMA standard.

The test controller 125 configures the SDR receiver 105 for operating under the subsequent standard (process step 390). In addition, the test controller 125 configures the data block generator 130 for testing the SDR receiver 105 using the subsequent standard (process step 395). The test controller 125 then prompts the data block generator 130 to initiate another producer thread and the results generator 135 to initiate another consumer thread (process step 320), and the method continues as before.

The test data generated by the performance analyzer 265 and provided to the results generator 135 in step 375 may comprise a switching time for the SDR receiver 105, which is the amount of time used to configure the SDR receiver 105 for the standard to be tested. Thus, because a single SDR test module 120 is capable of configuring the SDR receiver 105 for different standards and testing the SDR receiver 105 under those standards instead of requiring the use of different sets of equipment for each standard, the SDR test module 120 may easily determine how quickly the SDR receiver 105 is able to switch between standards. In addition, using a method such as this, the SDR receiver 105 may demodulate signals pertaining to different telecommunication standards for testing purposes, with the results provided visually by the test controller 125. This may be accomplished without special hardware in a cost-effective manner using multi-threaded USB control for increased speed.

Although the SDR test module 120 described in connection with FIGS. 1 and 3 is capable of testing an SDR receiver 105, it will be understood that the SDR test module 120 may also be capable of testing the receiving capability of an SDR transceiver. In addition, a similar system and method may be implemented to test an SDR transmitter and/or the transmitting capability of an SDR transceiver. For this embodiment, the SDR test module 120 may provide non-encoded data blocks to the SDR transmitter/transceiver and receive encoded data blocks from the SDR transmitter/transceiver, along with test data generated by a performance analyzer implemented in the SDR transmitter/transceiver.

Figure 4:
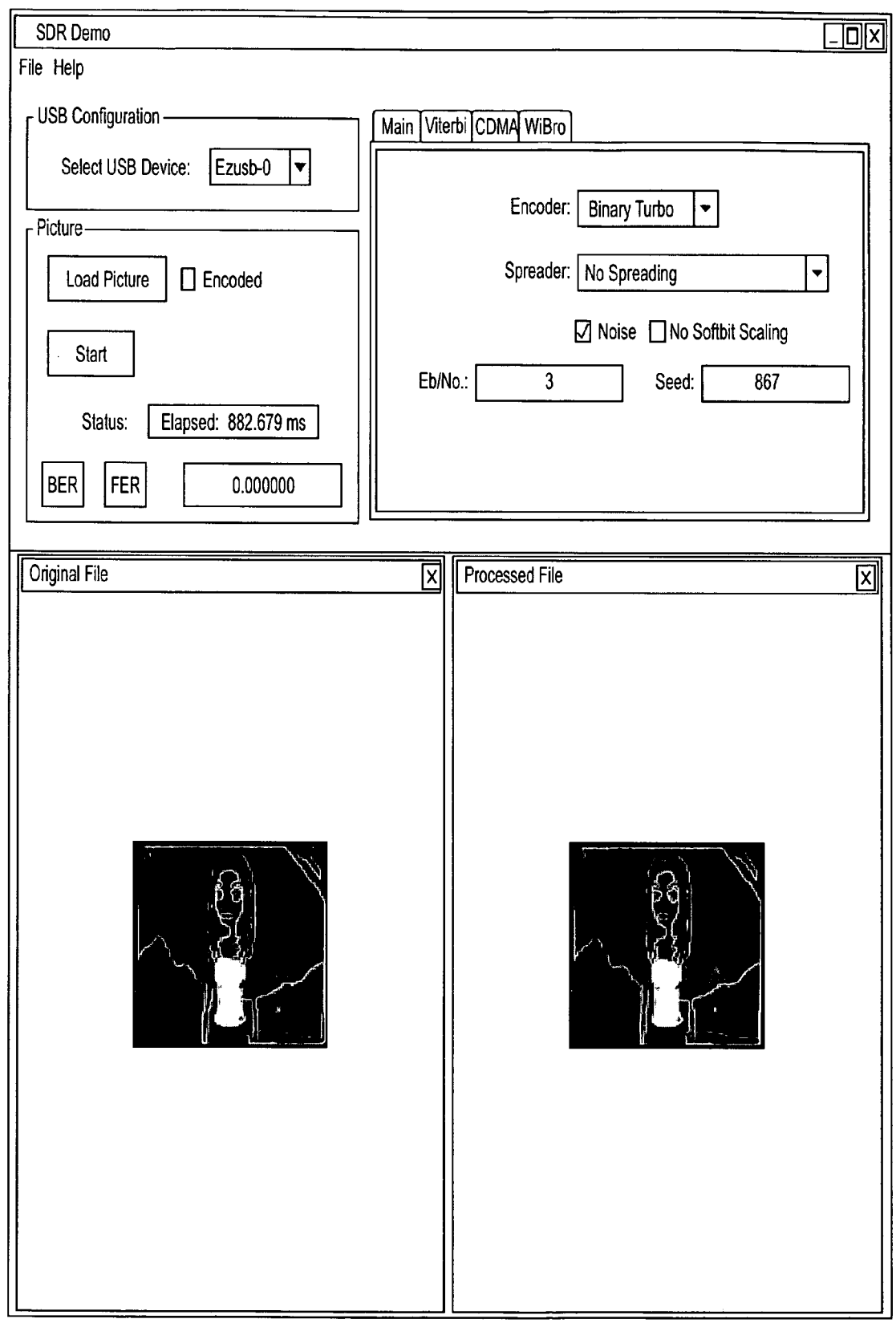
FIG. 4 illustrates a screen shot of a main window provided by the graphical user interface of FIG. 1 according to one embodiment of the disclosure.

FIG. 4 illustrates a screen shot of a main window 400 provided by the graphical user interface 145 according to one embodiment of the disclosure. For this example, the GUI module 145 provides three application dialogues related to three SDR applications: a GSM dialogue, a WCDMA/CDMA2000 dialogue and a WiBro dialogue.

The User Interface (UI) of the application is relatively simple with a single main dialogue having multiple property pages laid out to allow configuration of various parameters easily. The application may also allow profiles to be saved for easy access to custom configurations, as well as providing default testing parameters.

For the illustrated embodiment, the main window 400 provides uniquely designed user information with two child dialogues below the main dialogue to display the original file (in this example, an image file) and the processed file received from the SDR receiver 105.

Figure 5:
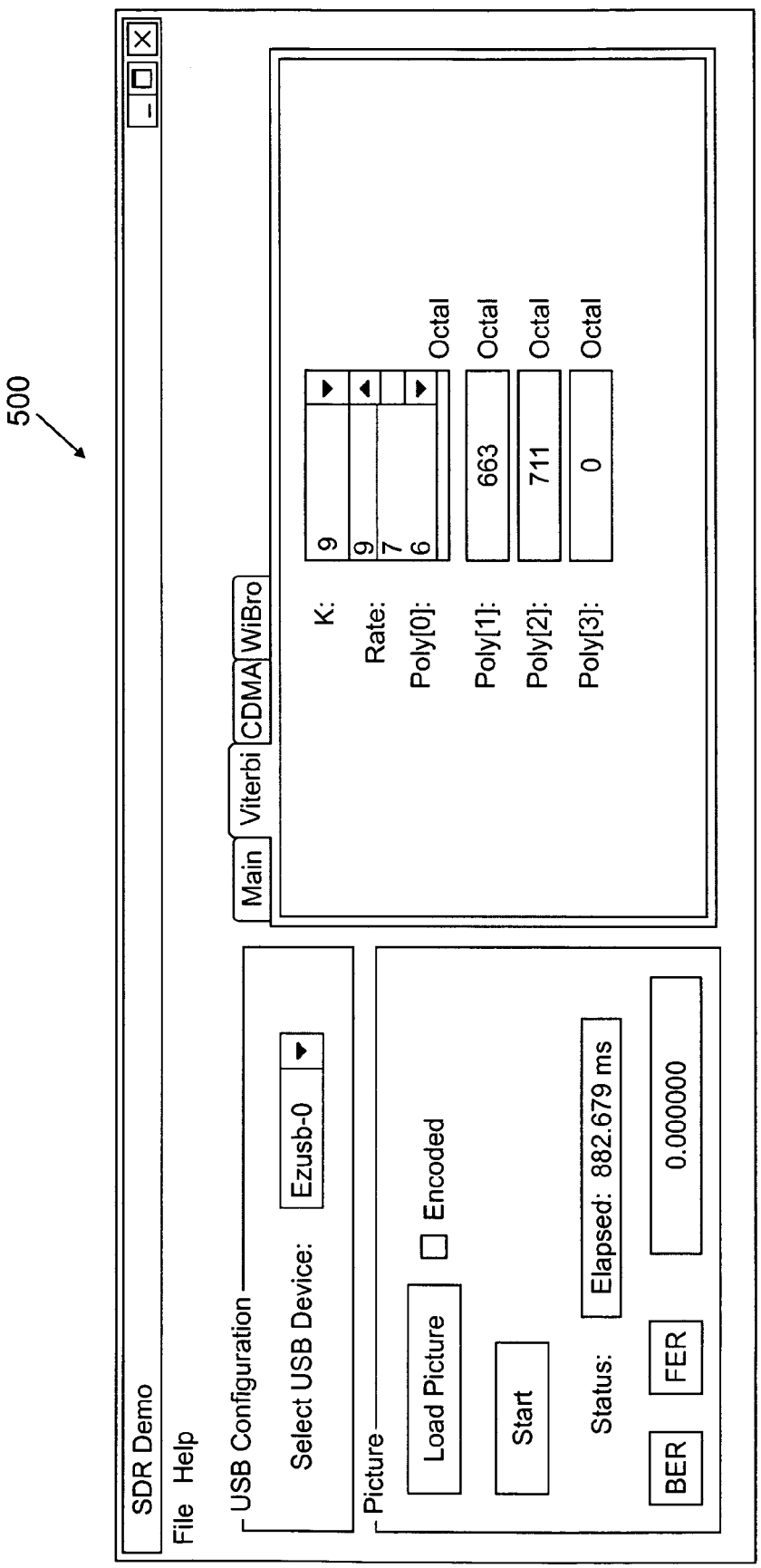
FIG. 5 illustrates a screen shot of a Viterbi configuration tab of the main window of FIG. 4 according to one embodiment of the disclosure.
Figure 6:
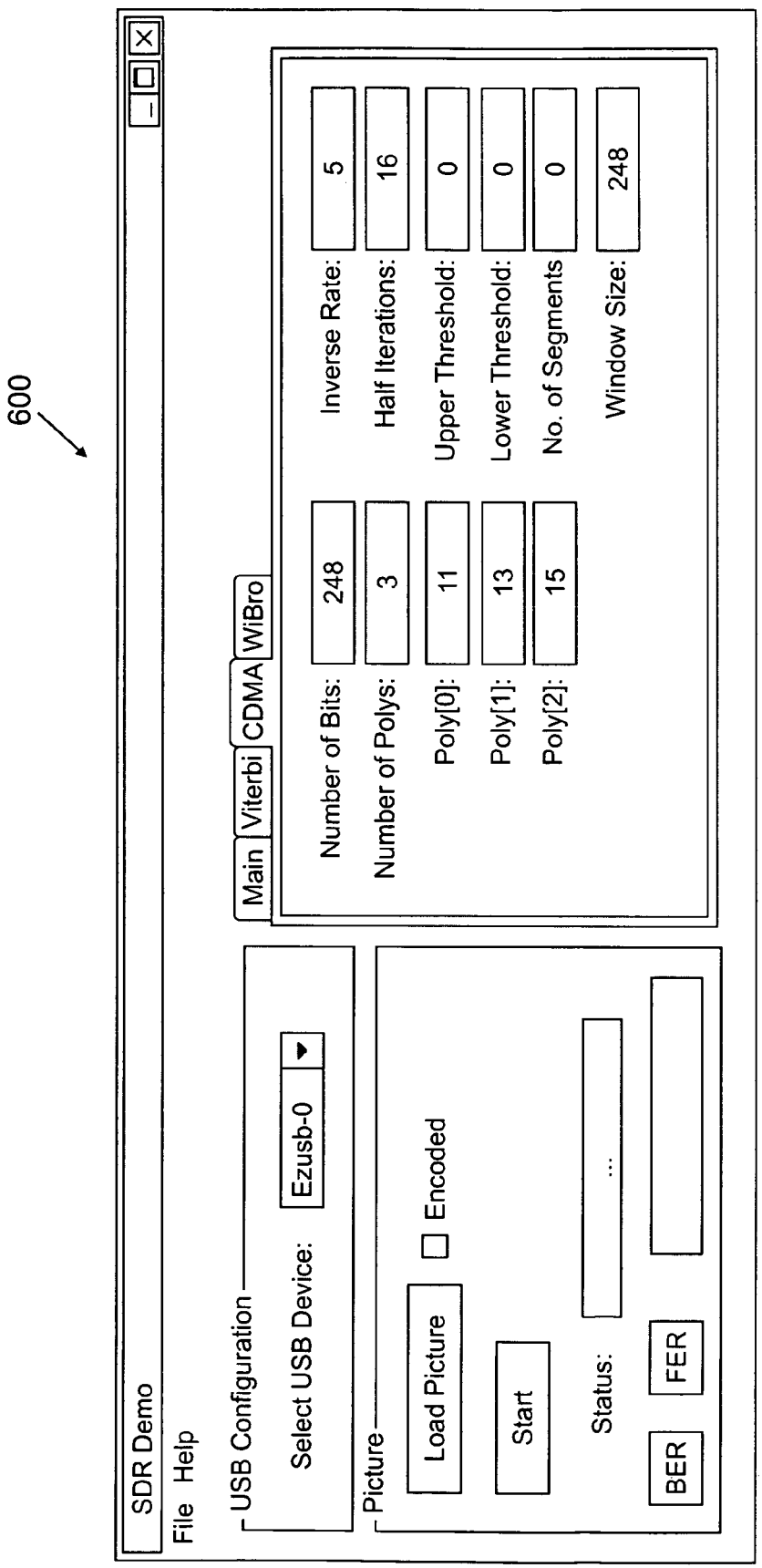
FIG. 6 illustrates a screen shot of a CDMA configuration tab of the main window FIG. 4 according to one embodiment of the disclosure.
Figure 7:
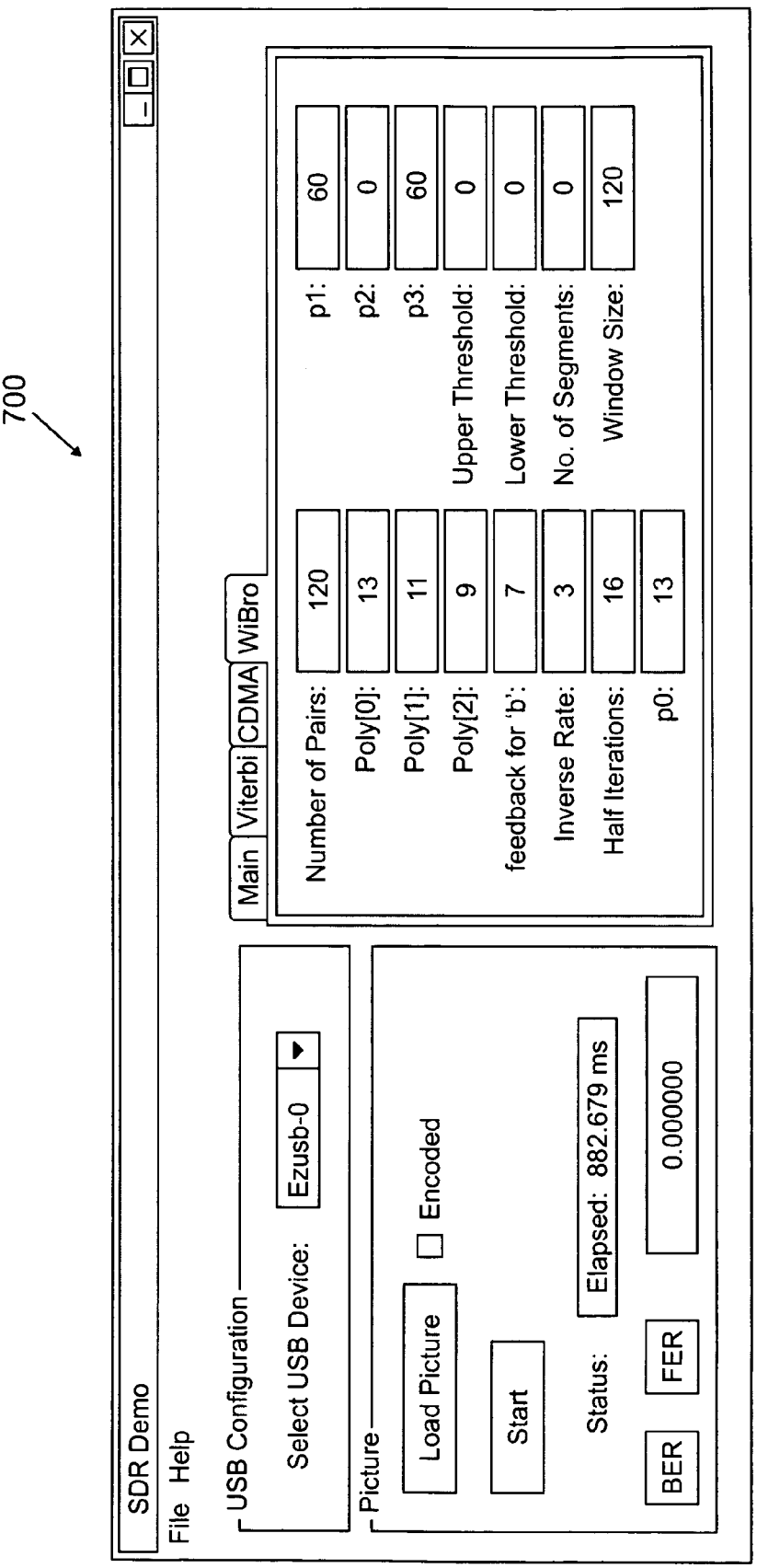
FIG. 7 illustrates a screen shot of a WiBro configuration tab of the main window of FIG. 4 according to one embodiment of the disclosure.

FIGS. 5-7 illustrate examples of the different dialogues and their content. Thus, FIG. 5 illustrates a screen shot of a Viterbi configuration tab 500 of the main window 400 provided by the graphical user interface 145, FIG. 6 illustrates a screen shot of a CDMA configuration tab 600 of the main window 400 provided by the graphical user interface 145, and FIG. 7 illustrates a screen shot of a WiBro configuration tab 700 of the main window 400 provided by the graphical user interface 145 according to one embodiment of the disclosure.

The Viterbi configuration tab 500, which corresponds to a GSM dialogue, provides multiple options for testing parameters: block size, rate, constraint length, polynomials and the like. Each of these testing parameters may be defined and changed. In the CDMA configuration tab 600, which corresponds to a WCDMA/CDMA2000 dialogue, and in the WiBro configuration tab 700, which corresponds to the WiBro dialogue, the user may define the different testing parameters of the CDMA and WiBro turbo decoders, respectively: block size, segment size, window size, stopping thresholds, rate, polynomials, number of iterations, number of segments and the like.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for testing a software-defined radio (SDR) device, the method comprising:
   configuring the SDR device for a first standard;
   performing a first test on the SDR device under the first standard by sending a plurality of data blocks to be decoded by the SDR device, wherein performing the first test on the SDR device comprises performing a producer thread and performing a consumer thread and wherein performing the producer thread comprises, for each of the plurality of data blocks that each comprise a portion of an original file encoding the data block, spreading the data block, adding noise to the data block, and transmitting the data block to the SDR device as an encoded data block;
   receiving a plurality of decoded data blocks from the SDR device; and
   receiving test data for the first test from the SDR device.

2. The method as set forth in claim 1, wherein performing the producer thread comprises performing the producer thread based on the first standard.

3. The method as set forth in claim 1, wherein performing the consumer thread comprises receiving the plurality of decoded data blocks from the SDR device, each of the decoded data blocks generated by the SDR device based on a corresponding one of the encoded data blocks transmitted to the SDR device.

4. The method as set forth in claim 3, wherein performing the consumer thread further comprises constructing a processed file based on the decoded data blocks and providing the processed file to a user for comparison to the original file.

5. The method as set forth in claim 1, wherein performing the consumer thread comprises performing the consumer thread simultaneously with the producer thread.

6. The method as set forth in claim 1, wherein receiving the test data for the first test from the SDR device comprises receiving test data generated by a performance analyzer in the SDR device.

7. The method as set forth in claim 1, further comprising calculating statistical results for the first test based on the test data from the first test.

8. The method as set forth in claim 1, further comprising:
prior to configuring the SDR device for the first standard, configuring the SDR device for a prior standard, and
wherein configuring the SDR device for the first standard comprises switching the SDR device from a configuration for the prior standard to a configuration for the first standard.

9. The method as set forth in claim 1, further comprising:
configuring the SDR device for a second standard different from the first standard;
performing a second test on the SDR device under the second standard;
receiving test data from the second test from the SDR device.

10. A system for testing a software-defined radio (SDR) receiver, the system comprising:
a data block generator configured to perform a producer thread by sending a plurality of data blocks to be decoded by the SDR receiver;
a results generator configured to perform a consumer thread by receiving a plurality of decoded data blocks from the SDR receiver; and
a test controller coupled to the data block generator and the results generator, the test controller configured to configure the SDR device for one of a plurality of standards and to initiate a test by prompting the data block generator to perform the producer thread and by prompting the results generator to perform the consumer thread,
wherein the data block generator comprises:
an encoder configured, for each of the plurality of data blocks that each comprise a portion of an original file, to encode the data block;
a spreader coupled to the encoder, the spreader configured to spread the data block; and
a noise provider coupled to the spreader, the noise provider configured to add noise to the data block.

11. The system as set forth in claim 10, wherein the encoder is configured to encode the data block in 256-bit data blocks.

12. The system as set forth in claim 10, wherein the noise provider is configured to add Gaussian noise based on a noise level selection provided by the test controller.

13. The system as set forth in claim 10, wherein the data block generator is further configured to transmit the data block to the SDR receiver as an encoded data block.

14. The system as set forth in claim 13, wherein each of the decoded data blocks is generated by the SDR receiver based on a corresponding one of the encoded data blocks transmitted to the SDR receiver.

15. The system as set forth in claim 14, wherein the results generator is further configured to perform the consumer thread by constructing a processed file based on the decoded data blocks and providing the processed file to a user for comparison to the original file.

16. The system as set forth in claim 10, wherein the results generator is further configured to receive test data from the SDR receiver following completion of the producer thread and the consumer thread and to calculate statistical results based on the test data.

17. The system as set forth in claim 16, wherein the test controller is further configured to configure the SDR receiver for a subsequent one of the standards following completion of the producer thread and the consumer thread and to initiate a subsequent test by prompting the data block generator to perform a subsequent producer thread based on the subsequent standard and by prompting the results generator to perform a subsequent consumer thread.

18. The system as set forth in claim 17, wherein the results generator is further configured to receive subsequent test data from the SDR receiver following completion of the subsequent producer thread and the subsequent consumer thread and to calculate subsequent statistical results based on the subsequent test data.

19. The system as set forth in claim 10, wherein the results generator is configured to perform the consumer thread concurrently with the producer thread.

20. A system for testing a software-defined radio (SDR) device, the system comprising:
a test module configured to configure the SDR device for a first standard, perform a producer thread by sending a plurality of data blocks to be decoded by the SDR device, and perform a consumer thread by receiving a plurality of decoded data blocks from the SDR device, wherein the test module is configured to perform the producer thread by, for each of the plurality of data blocks that each comprise a portion of an original file, encoding the data block, spreading the data block, adding noise to the data block, and transmitting the data block to the SDR device as an encoded data block; and
the SDR device coupled to the test module, the SDR device comprising a performance analyzer configured to generate test data for the test module.

21. The system as set forth in claim 20, wherein the test module is further configured to configure the SDR device for the first standard prior to performing the producer thread and the consumer thread.

22. The system as set forth in claim 21, wherein the test module is configured to perform the producer thread based on the first standard.

23. The system as set forth in claim 20, wherein the test module is configured to perform the consumer thread by receiving the plurality of decoded data blocks from the SDR device, each of the decoded data blocks generated by the SDR device based on a corresponding one of the encoded data blocks transmitted to the SDR device, and the test module is further configured to perform the consumer thread by constructing a processed file based on the decoded data blocks and providing the processed file to a user for comparison to the original file.

24. The system as set forth in claim 21, wherein the test module is further configured to receive the test data generated by the performance analyzer from the SDR device following completion of the producer thread and the consumer thread and to calculate statistical results based on the test data.

25. The system as set forth in claim 20, wherein the test module is configured to perform the consumer thread simultaneously with the producer thread.

* * * * *